US012155707B2

(12) United States Patent
Sodagar

(10) Patent No.: US 12,155,707 B2
(45) Date of Patent: Nov. 26, 2024

(54) METHOD AND APPARATUS FOR MANAGEMENT OF SPLIT-RENDERING IN 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/497,459

(22) Filed: Oct. 30, 2023

(65) Prior Publication Data

US 2024/0155013 A1 May 9, 2024

Related U.S. Application Data

(60) Provisional application No. 63/423,726, filed on Nov. 8, 2022, provisional application No. 63/423,390, filed on Nov. 7, 2022, provisional application No. 63/423,377, filed on Nov. 7, 2022.

(51) Int. Cl.
| | |
|---|---|
| *G06F 15/16* | (2006.01) |
| *H04L 65/61* | (2022.01) |
| *H04L 65/75* | (2022.01) |

(52) U.S. Cl.
CPC .............. *H04L 65/61* (2022.05); *H04L 65/75* (2022.05)

(58) Field of Classification Search
CPC ................................. H04L 65/61; H04L 65/75
USPC ......................................................... 709/219
See application file for complete search history.

(56) References Cited

U.S. PATENT DOCUMENTS

| | | | |
|---|---|---|---|
| 2021/0144517 A1 | 5/2021 | Guim Bernat et al. | |
| 2021/0152615 A1* | 5/2021 | Karampatsis | ....... H04L 65/1016 |
| 2021/0281638 A1 | 9/2021 | Vrcelj et al. | |
| 2021/0358219 A1 | 11/2021 | Melkote Krishnaprasad et al. | |
| 2022/0321628 A1* | 10/2022 | Rhyu | ..................... A63F 13/355 |
| 2023/0137968 A1* | 5/2023 | Stockhammer | ... H04W 28/0268 370/235 |
| 2023/0370514 A1* | 11/2023 | Kolan | .................... H04W 56/00 |
| 2024/0087486 A1* | 3/2024 | Ellappan | ............... G06F 1/1698 |

OTHER PUBLICATIONS

International Search Report dated Mar. 8, 2024, issued in International Application No. PCT/US23/36358.
Written Opinion dated Mar. 8, 2024, issued in International Application No. PCT/US23/36358.

(Continued)

*Primary Examiner* — Alan S Chou
(74) *Attorney, Agent, or Firm* — Sughrue Mion, PLLC

(57) ABSTRACT

A method performed by a UE, comprising: receiving a request to split a client media function; determining, after reception of the request to split of the client media function, one or more client media capabilities; transmitting, to a network edge device, a request to split the client media function; negotiating, with the network edge device, the split of the client media function based on the one or more client media capabilities and one or more capabilities of a 5GMS AS; receiving, from the network edge device, an acknowledgment that a split-rendering process for the client media function has started on the 5GMS AS; and transmitting an acknowledgement that the split-rendering process for the client media function has started on the 5GMS AS.

10 Claims, 11 Drawing Sheets

(56) References Cited

OTHER PUBLICATIONS

"MeCAR Permanent Document v3.1," Xiaomi (Rapporteur), 3GPP TSG SA WG4 121 Meeting, Nov. 14-18, 2022, S4-221272 (33 pages total).
"Split Rendering Media Service Enabler," Qualcomm, 3GPP TSG SA# 96, Jun. 2022, SP-220685 (4 pages total).

* cited by examiner

METHOD AND APPARATUS FOR MANAGEMENT OF SPLIT-RENDERING IN 5G NETWORKS

CROSS-REFERENCE TO RELATED APPLICATION

This application claims priority from U.S. Provisional Application No. 63/423,726, filed on Nov. 8, 2022; U.S. Provisional Application No. 63/423,390, filed on Nov. 7, 2022; U.S. Provisional Application No. 63/423,377, filed on Nov. 7, 2022 in the United States Patent and Trademark Office, the disclosures of each of which are incorporated herein by reference in their entirety.

FIELD

The disclosure generally relates to managing processes in a $5^{th}$ generation (5G) media streaming (5GMS), and, in particular, to a method and apparatus for management of split-rendering in 5G networks.

BACKGROUND

The 3rd Generation Partnership Project (3GPP) defines a work item on split-rendering of media delivery services, in which the client media functions are split between the device and the network edge. Therefore, as a result of the split, the client runs lighter less demanding processes and may receive more complicated applications and services. Furthermore, the edge network decodes and partially renders received media to a simpler form, so that the client may run a lighter process. However, 3GPP does not define a split architecture or process for 3GPP split-rendering media service enabler (SR_MSE). 3GPP also has another working item for Augmented Reality devices. However, the current design only includes the media pipeline and does not include any split-rendering management.

SUMMARY

According to one or more embodiments, a method performed by a split-rendering client of a user equipment (UE) comprises receiving a request to split a client media function; determining, after reception of the request to split of the client media function, one or more client media capabilities; transmitting, to a split-rendering function of a network edge device, a request to split the client media function; negotiating, with the network edge device, the split of the client media function based on the one or more client media capabilities and one or more capabilities of a 5GMS application server (AS); receiving, from the network edge device, an acknowledgment that a split-rendering process for the client media function has started on the 5GMS AS; and transmitting an acknowledgement that the split-rendering process for the client media function has started on the 5GMS AS.

According to one or more embodiments, a method performed by a split-rendering function of a network edge device, the method comprising: receiving a request for a split management session to split a client media function; determining, after reception of the request for the split management session, one or more capabilities of a 5GMS application server (AS); transmitting, to a split-rendering client of a user equipment (UE), a request to split the client media function; negotiating, with the UE, the split of the client media function based on the one or more capabilities of the 5GMS AS and one or more client media capabilities of the UE; and transmitting, after the negotiating, a request to the 5GMS AS to start a split-rendering process for the client media function.

According to one or more embodiments, a user equipment, comprising: at least one memory configured to store program code; and at least one processor configured to read the program code and operate as instructed by the program code, the program code including: first receiving code configured to cause the at least one processor to receive a request to split a client media function; determining code configured to cause the at least one processor to determine, after reception of the request to split of the client media function, one or more client media capabilities; first transmitting code configured to cause the at least one processor to transmit, to a split-rendering function of a network edge device, a request to split the client media function; negotiating code configured to cause the at least one processor to negotiate, with the network edge device, the split of the client media function based on the one or more client media capabilities and one or more capabilities of a 5GMS application server (AS); second receiving code configured to cause the at least one processor to receive, from the network edge device, an acknowledgment that a split-rendering process for the client media function has started on the 5GMS AS; and second transmitting code configured to cause the at least one processor to transmit an acknowledgement that the split-rendering process for the client media function has started on the 5GMS AS.

According to one or more embodiments, a network edge device, comprising: at least one memory configured to store program code; and at least one processor configured to read the program code and operate as instructed by the program code, the program code including: receiving code configured to cause the at least one processor to receive a request for a split management session to split a client media function; determining code configured to cause the at least one processor to determine, after reception of the request for the split management session, one or more capabilities of a 5GMS application server (AS); first transmitting code configured to cause the at least one processor to transmit, to a split-rendering client of a user equipment (UE), a request to split the client media function; negotiating code configured to cause the at least one processor to negotiate, with the UE, the split of the client media function based on the one or more capabilities of the 5GMS AS and one or more client media capabilities; and second transmitting code configured to cause the at least one processor to transmit, after the negotiating, a request to the 5GMS AS to start a split-rendering process for the client media function.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
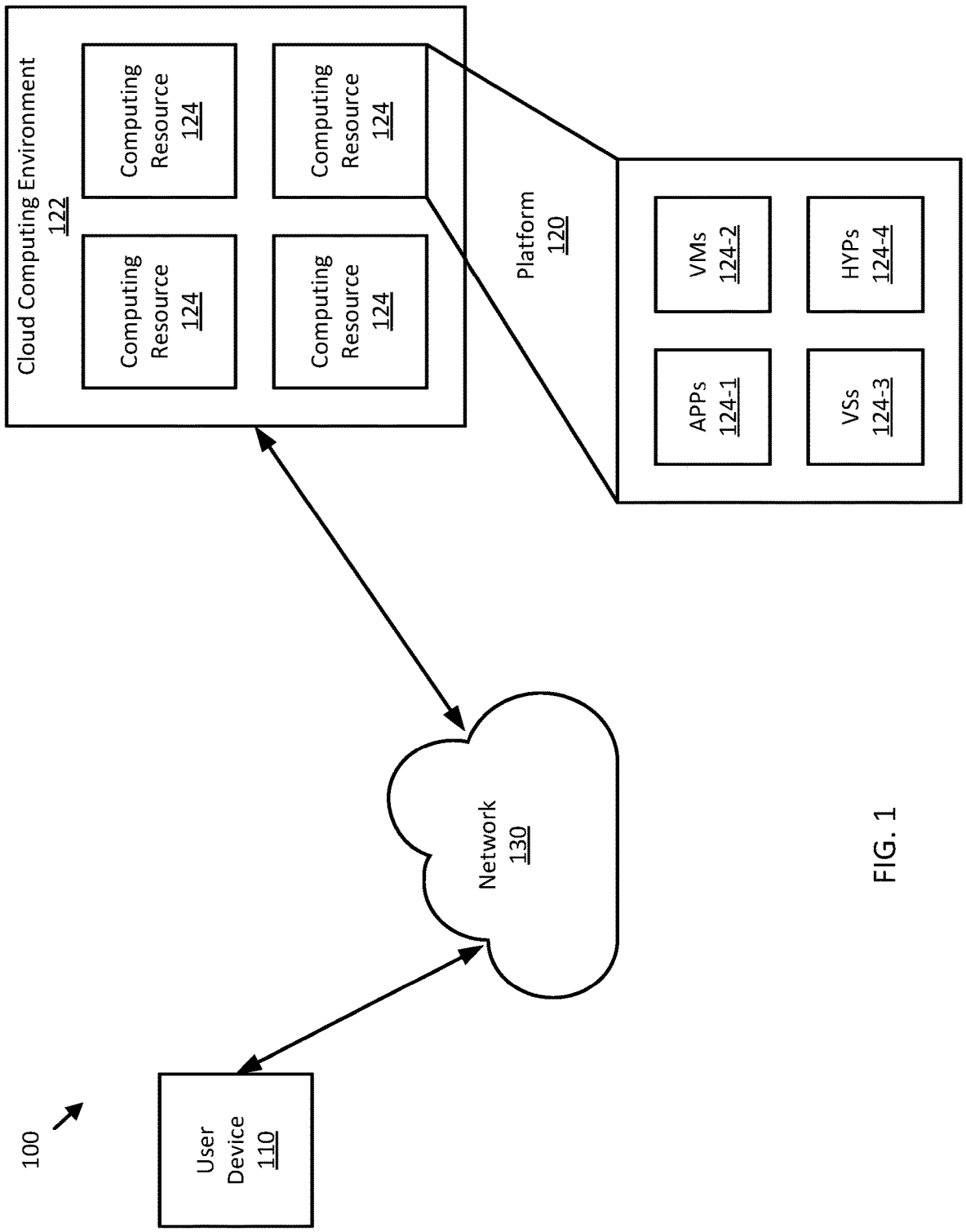
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms.

Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124

(referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
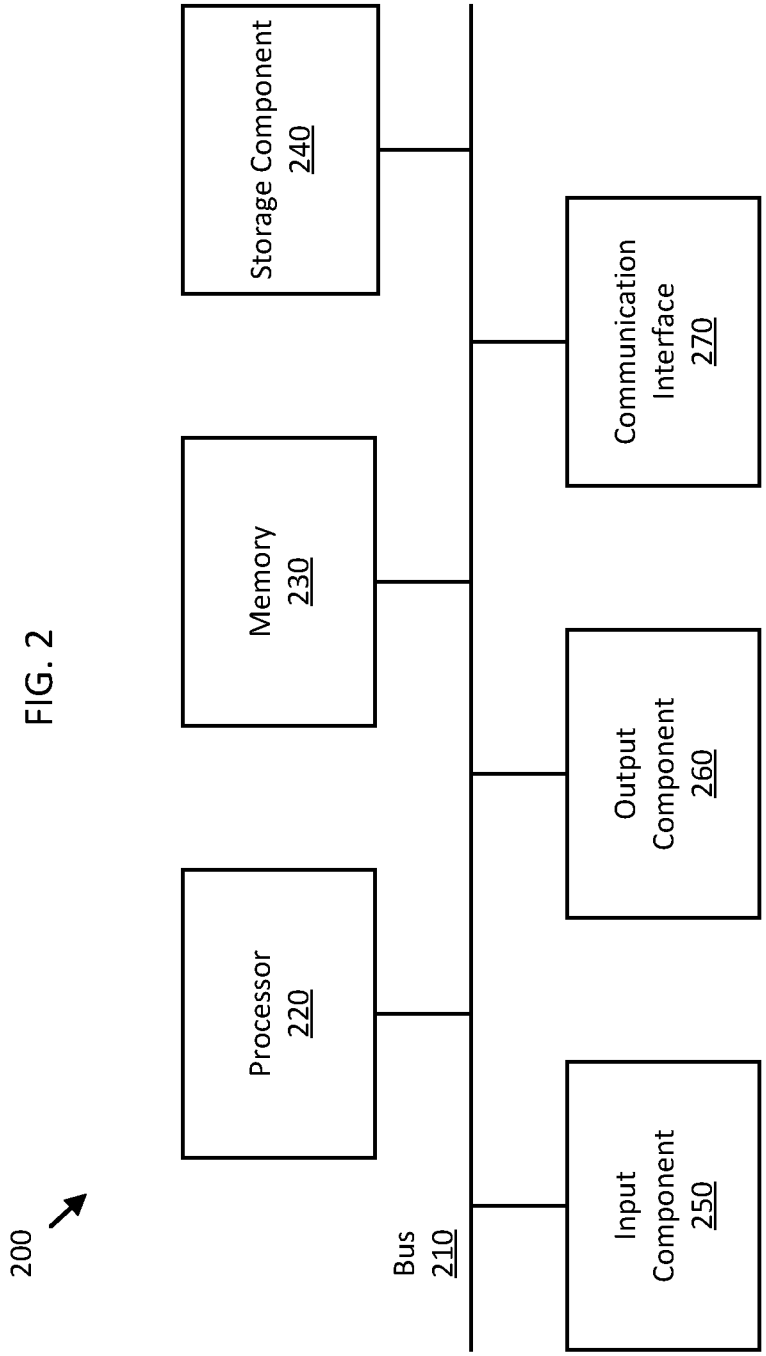
FIG. 2 is a block diagram of example components of one or more devices of FIG. 1, according to embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
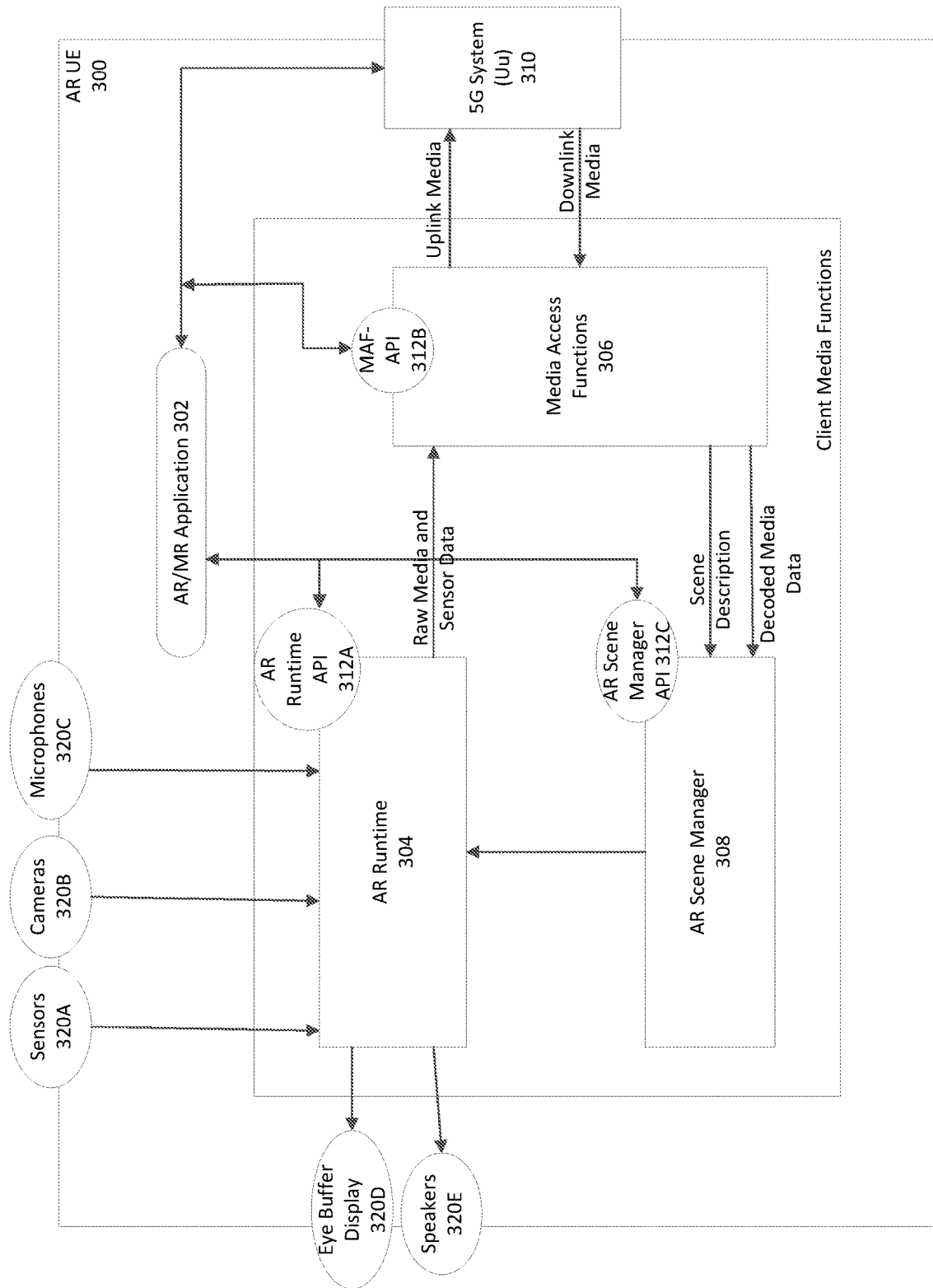
FIG. 3 is a diagram of an architecture of an Augmented Reality (AR) user equipment (UE), according to embodiments.

FIG. 3 is a diagram of an architecture of an Augmented Reality (AR) UE 300, according to one or more embodiments. The AR UE 500 may be a 5G UE with 5G connectivity provided through an embedded 5G modem and 5G system components. The AR UE 300 may include several components and user controllers for AR experiences including, but not limited to, sensors 320A, cameras 320B, microphones 320C, eye buffer display 320D, and speakers 320E.

The AR UE 500 may include AR/MR Application 302 that is configured to communicate with various device resources to provide an AR experience to a user. In one or more examples, the AR/MR Application 302 communicates with a AR Runtime 304 via a AR Runtime API 312A, with a Media Access Functions (MAF) via a MAF-API 312B, and a AR Scene Manager 308 via a AR Scene Manager API 312C. These APIs enable the AR/MR Application 302 to discover and query the media capabilities in terms of support as well as available resources at runtime.

In one or more examples, when the AR/MR application 302 is running, the downlink media flows from a 5G System 310 to the MAF 306 in a compressed form, and then from the MAF 306 to the AR Scene Manger 308 in a decoded form. The MAF 306 may further provide a scene description to the AR Scene Manager 308. In one or more examples, in parallel, the AR UE 300 is configured to establish an uplink data flow from the AR Runtime 304 to the MAF 306, where raw media and sensor data may be in an uncompressed form, and then from the MAF 306 to the 5G System 310, where the MAF 306 may have compressed the data in order to facilitate an expected transmission over the network.

Figure 4A:
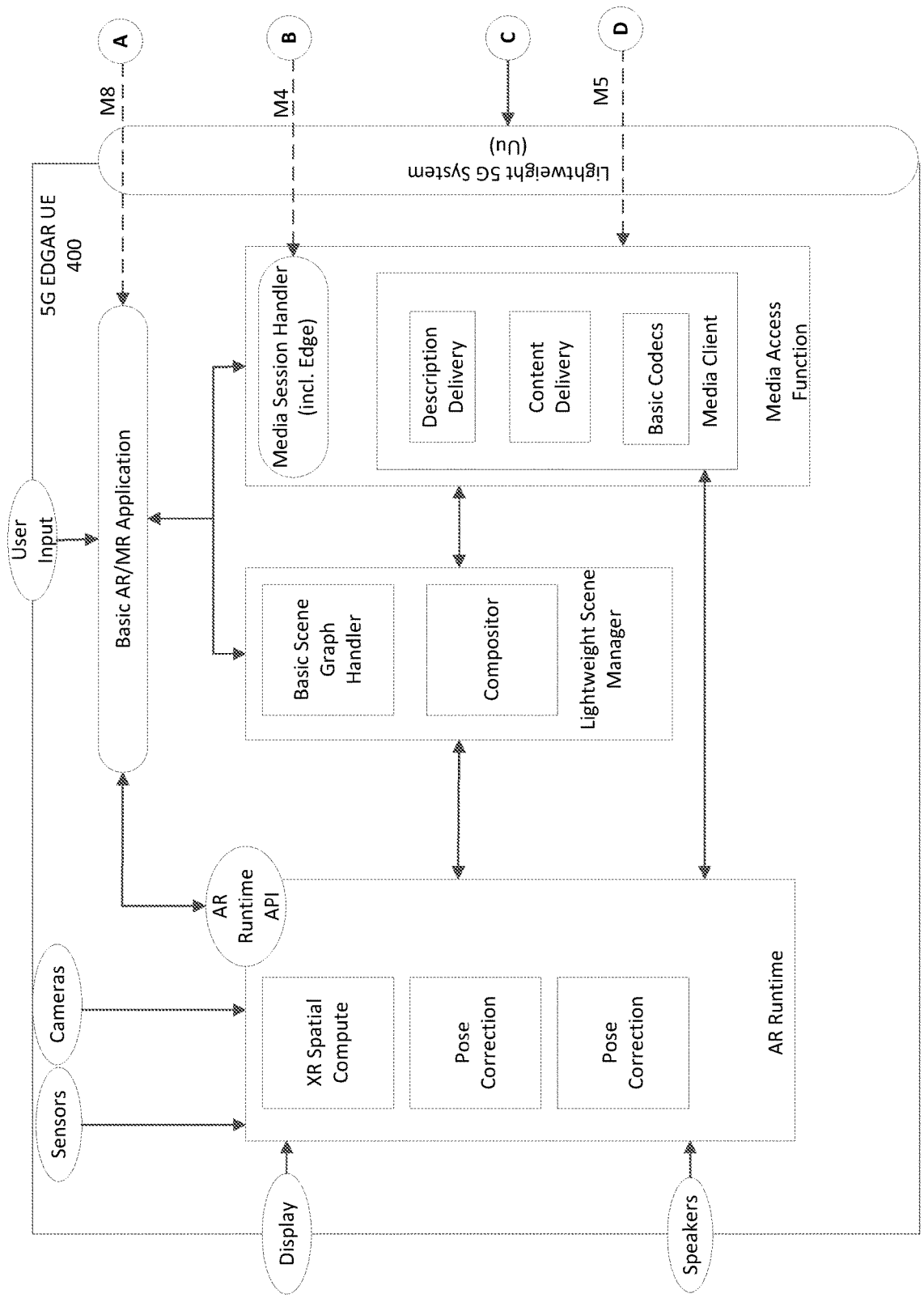
FIGS. 4A and 4B is a diagram of an architecture of a 5G Standalone EDGe-Dependent AR (5G_STAR EDGAR) UE, according to embodiments.
Figure 4B:
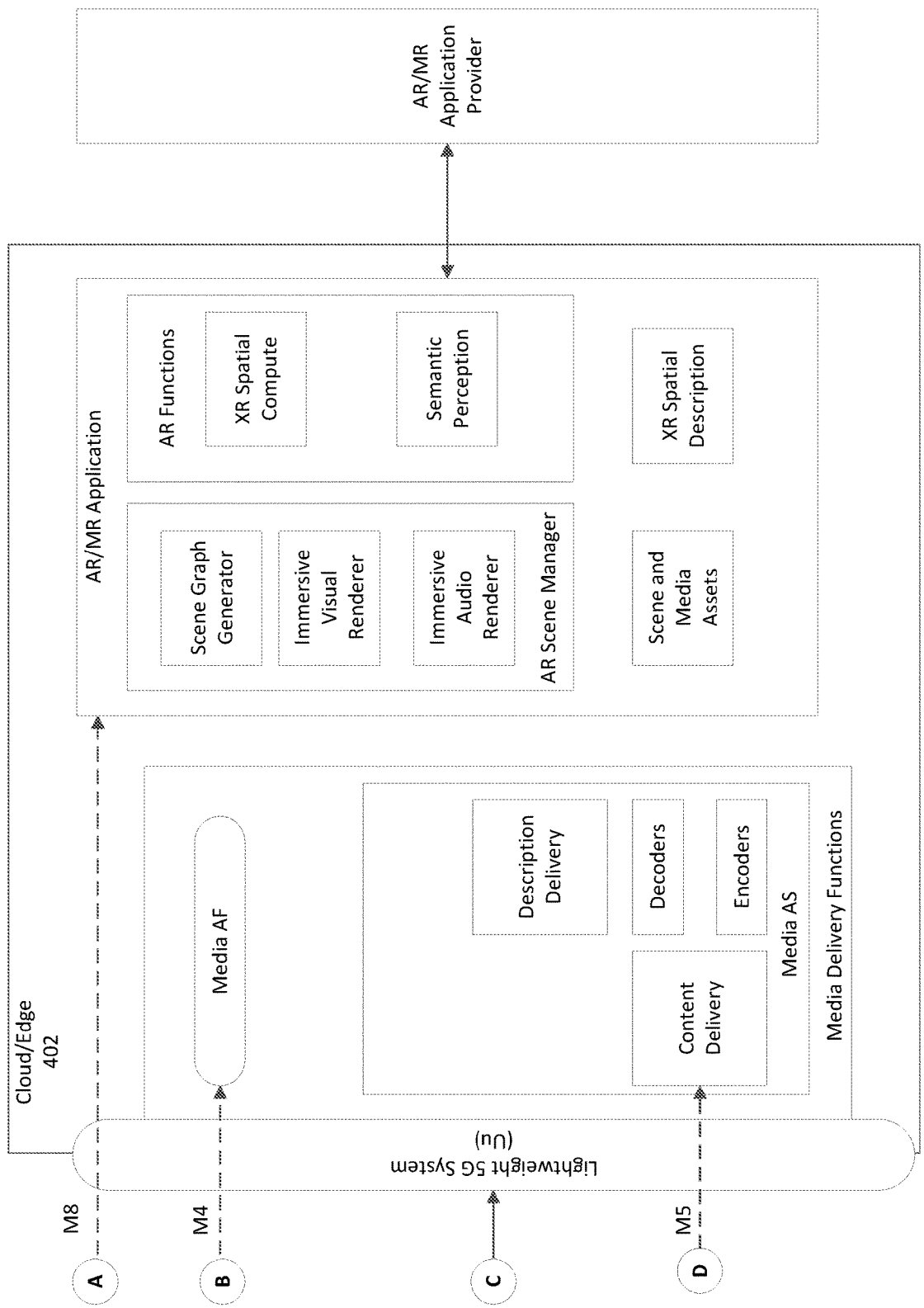

When an Application and/or an Application Service Provider decides to run the client media function in the split-rendering fashion, this functionality is replaced with two new modules: an edge-dependent light media service client, and a media processing application running on 5GMS AS. In one or more examples, a client media function may be an application or one or more tasks to be executed by a client device such as a UE. FIGS. 4A and 4B illustrate an example of a media delivery architecture having a 5G EDGAR UE 400 and a cloud/edge 402 for implementing a split. However, the 3GPP SR_MSE does not specify an architecture or process for performing split-rendering.

Figure 5:
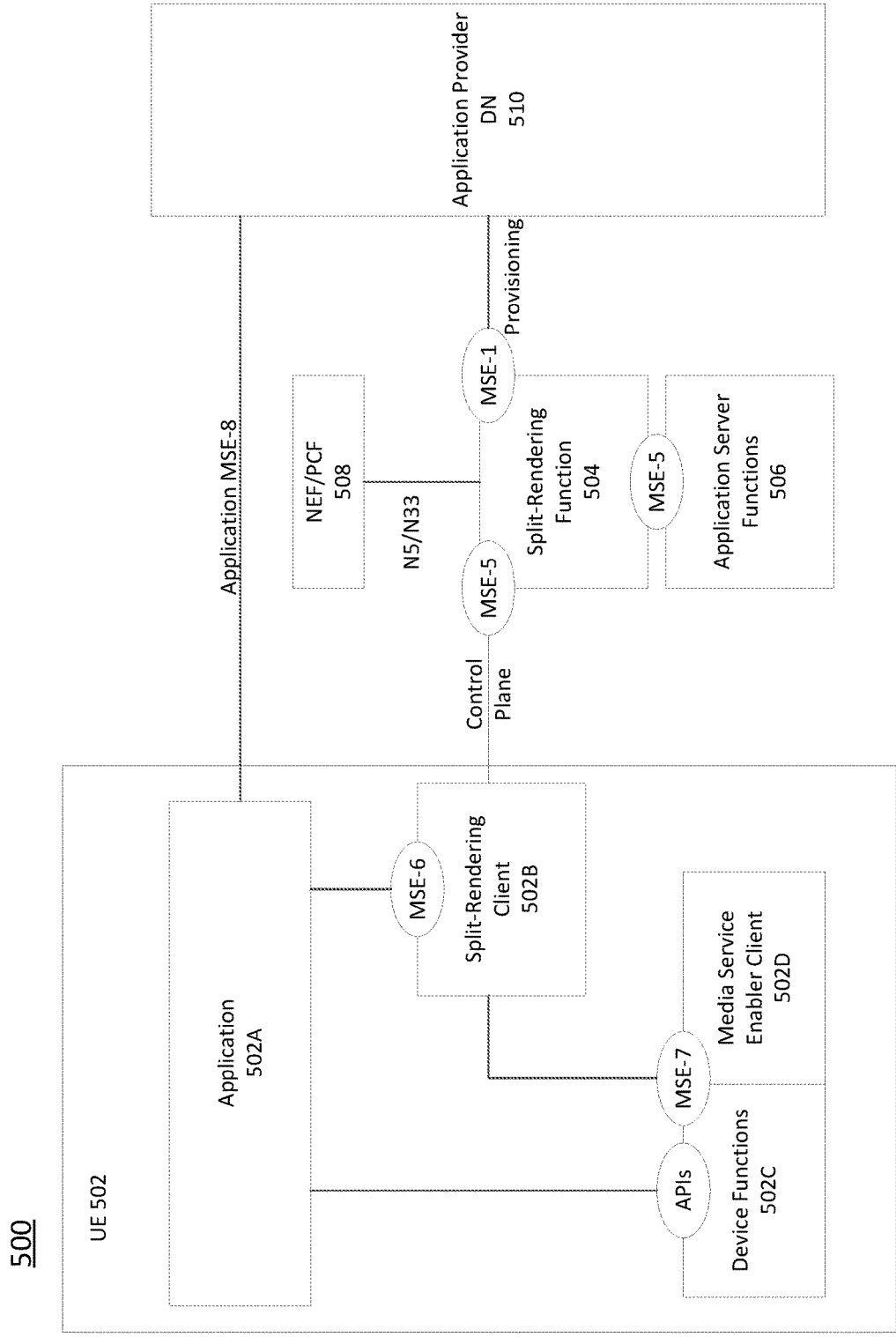
FIG. 5 is a diagram of a split management architecture, according to embodiments.

Embodiments of the present disclosure are directed to providing an architecture and process for performing split. To manage the split, several entities in the device and network interact with each other. FIG. 5 illustrates an example split management architecture 500 that defines these entities and corresponding interfaces.

The split management architecture 500 includes a UE 502 that includes an Application 502A, split-rendering client (SRC) 502B, device functions 502C, and media service enabler client 502D. The split-rendering client 502B communicates with a split-rendering function (SRF) 504. The SRF 504 may be included in a network edge device such as an edge server. In one or more examples, the SRF 504 may be a module, unit, or dedicated circuit in the network edge device that performs one or more processes associated with split-rendering such as querying the capabilities of another device in the network, negotiating tasks to be split, and initiating split-rendering.

According to one or more embodiments, SRC 502B may be responsible on the behalf of the UE for negotiations with edge to determine a split-rendering configuration. The SRF 504 is responsible on behalf of the edge for negotiations with the UE to find the split-rendering configuration.

According to one or more embodiments, the entities in the split management architecture 500 use the following interfaces to interact with each other and other entities.

In one or more examples, a media service enabler (MSE) 5 (MSE-5) interface is used for the SRC 502B and SRF 504 negotiation on split. This interface may be used for negotiation at the beginning of the media delivery session and/or during the media delivery session to update/change the split.

In one or more examples, a MSE-7 interface may be used for the SRC 502B to discover the client's capabilities. The device capabilities may be retrieved by the SRC 502B with this interface. The device capabilities may be retrieved from the device functions 502C and/or the media service enabler client 502D. The MSE-7 interface may provide static and dynamic capabilities. For example, a static capability may be a capability that does not change during a media delivery session. A dynamic capability may be a capability that may change during the media delivery session.

In one or more examples, a MSE-6 interface may be used by the SRC 502*b* and Application 502A to interact with each other. This interface may be used by the Application 502A to request the SRC 502B to manage a split and to retrieve the status of the split management.

In one or more examples, a MSE-1 interface may be used for SRF 504 to interact with the Application Service Provider (ASP) 510. The ASP 510 may use this interface to provision the split management session, and also to retrieve the status of a split during a media delivery session.

In one or more examples, a MSE-3 interface may be used by the F SRF 504 to discover capabilities of a 5GMS application server (AS) capabilities. This interface is used by SRF to retrieve the static and dynamic capabilities of the 5GMS AS.

In one or more examples, a MSE-8 interface may be used for communication between the Application 502A and ASP 510.

In one or more examples, the Application 502A communicates with the device functions 502C with one or more APIs. The SRF 504 may communicate the Network Exposure Function (NEF)/Policy or Control Function (PCF) 508 using a N5/N33 interface.

In one or more examples, one of two different deployment scenarios for the start of split negotiation. In one or more examples, the split negotiation may be client-initiated. In a client-initiated split negotiation, the Application 502A may request the SRC 502B to initiate the split negotiation. The SRC 502B may negotiate with the SRF 504 to find the best or optimal split. In one or more examples, the best or optimal split may be a split of an application that minimizes usage of resources of the UE 502 and the 5GMS AS. The Application 502A may also authorize the SRC 502B to renegotiate the split during a media delivery session due to a change in the client's available resources.

In one or more examples, the split negotiation may be network-initiated. In a network-initiated split the ASP 510 may request the SRF 504 to initiate the split negotiation. The SRF 504 may offer the possibility to the SRC 502B and starts negotiating to find the best split. The ASP 510 may also authorize the SRF 504 to renegotiate the split during the session due to a change in available resources of the 5GMS AS.

According to one or more embodiments, the split management may be static or dynamic. In one or more examples, a static split management may be performed where the split management architecture is run before starting the media delivery session or when a non-split-rendering media delivery session is decided to be split. In a static split management, the splitting of the client media functions occurs only once before or during the media delivery session.

In one or more examples, a dynamic split management may be performed where the split management architecture is run in parallel to the media delivery session. In a dynamic split management, the performance of the client and 5GMS AS may be monitored during the media delivery session and a new split may be performed depending on the condition of the client and/or the 5GMS AS. In one or more examples, the performance of the client may be determined based on a workload of the client exceeding a workload threshold or a processing speed of the client decreasing below a processing speed threshold. In one or more examples, the performance of the 5GMS AS may be determined based on a workload of the 5GMS AS exceeding a workload threshold or a processing speed of the 5GMS AS decreasing below a processing speed threshold.

Figure 6:
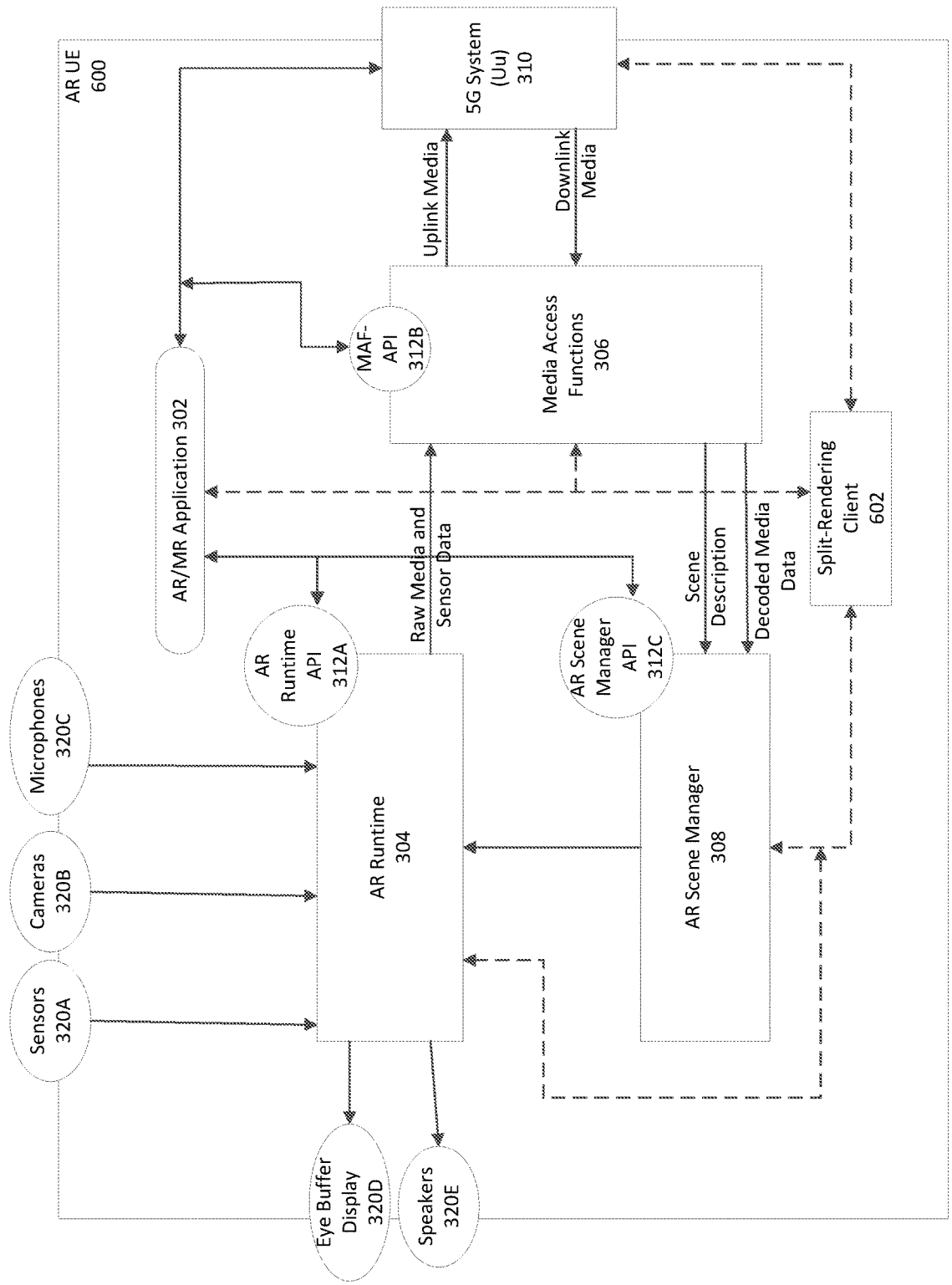
FIG. 6 is a diagram of a device architecture of a AR UE with added split-rendering management capability, according to embodiments.

FIG. 6 illustrates an example AR UE 600 that includes the components of the AR UE 300 with a SRC 602. The AR/MR Application 302 has access to the SRC 602 on the device. The SRC 602 may be responsible to negotiate with the network to run a part of the application on the edge network. The SRC may have APIs to the MAF 306, AR Runtime 304, and AR Scene Manager 308 to discover the capabilities of the device. The SRC 602 may negotiate with the network through its 5G system interface. In one or more example, the split-rendering management may be run in parallel to the media delivery pipeline.

Figure 7:
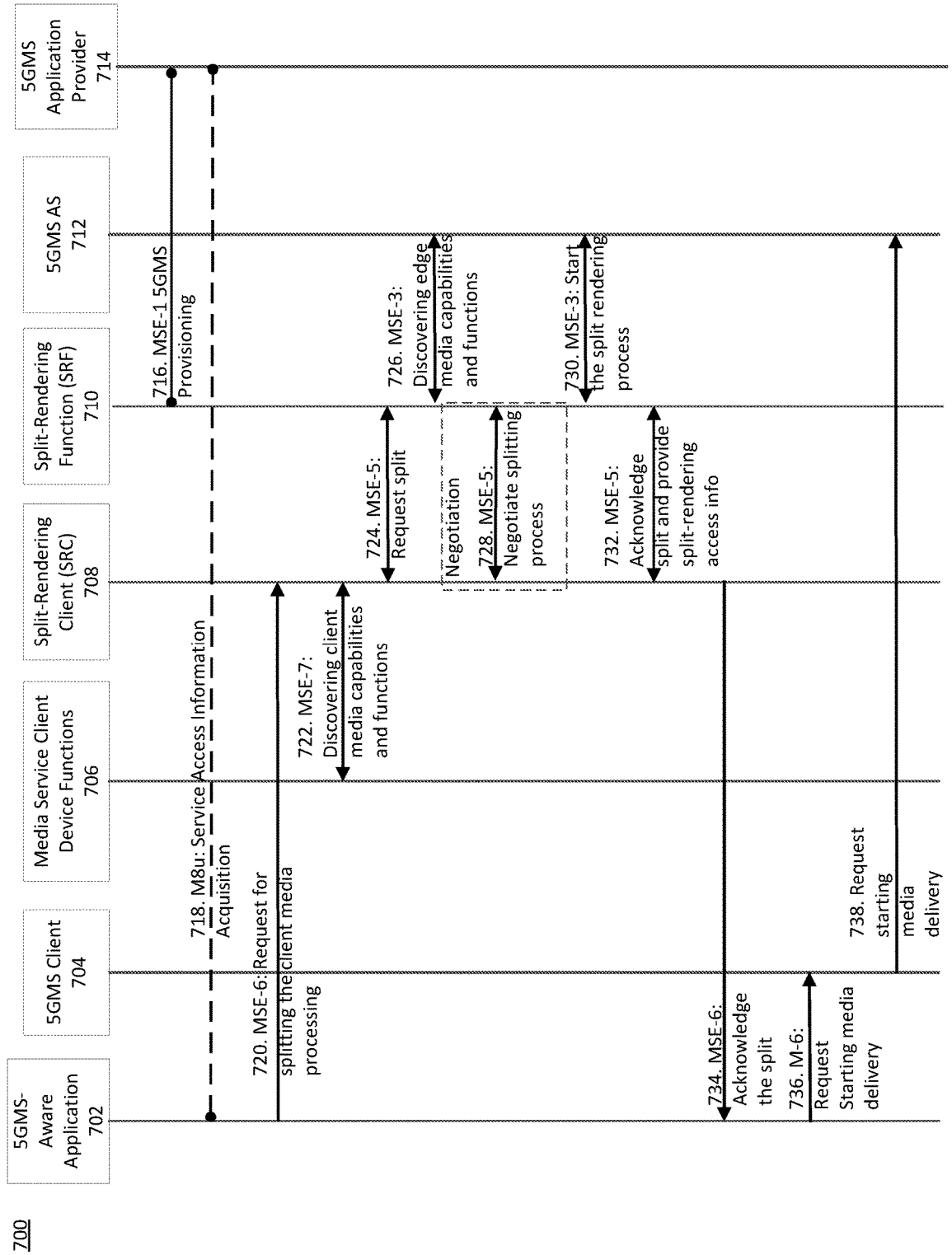
FIG. 7 is a diagram of an operation flow of a client-driven split management process, according to embodiments.

FIG. 7 illustrates a diagram of an operation flow 700 for setting up split-rendering by a client. The operation flow 700 may be performed between a 5GMS Aware Application 702, a 5GMS Client 704, a Media Service Client Device Functions 706, a SRC 708, a SRF 710, a 5GMS AS 712, and a 5GMS Application Provider 714. The 5GMS Aware Application 702 may correspond to the Application 502A (FIG. 5). The 5GMS Client 704 may be incorporated within the UE 502 (FIG. 5). The Media Service Device Functions 706 may correspond to the Device Functions 502C (FIG. 5). The SRC 708 may correspond to the SRC 502B (FIG. 5). The SRF 710 may correspond to the SRF 504. The 5GMS Application Provider 714 may correspond to the Application Provider 510.

The operation flow 700 may start at operation 716 where the 5GMS Application Provider 714 requests the SRF 710 to provision a split management session. The request may be performed over a MSE-1 interface.

In operation 718, the split management session is announced to the 5GMS Aware Application 702 as part of the Service Access Information. The announcement may be performed over the M8u interface.

In operation 720, the 5GMS-Aware Application 702 requests a split of the client media functions from the SRC 708. The request in operation 720 may be performed over a MSE-6 interface.

In operation 722, the SRC 708 inquires the Media Service Client Device Functions 706 to discover the client's media capabilities. For example, the SRC 708 may transmit a request to the Media Service Client Device Functions 706, where the Media Service Client Device Functions 706 responds with a message indicating one or more device capabilities of the client. The messages of operation 722 may be transmitted over a MSE-7 interface.

In operation 724, the SRC 708 may request the SRF 710 for a split of the client media functions. The request may be transmitted over the MSE-5 interface.

In operation 726, the SRF 710 may inquire the 5GMS AS 712 about the capabilities of the 5GMS AS 712. The SRF 710 may transmit a message to the 5GMS AS 712, where the 5GMS 712 responds with a message indicating the capabilities of the 5GMS AS 712. The messages of operation 726 may be transmitted over a MSE-3 interface.

In operation 728, the SRC 708 and SRF 710 negotiate on the acceptable capabilities for the device, and agree on the split option. The negotiation between the SRC 708 and the SRF 710 may be based on the client capabilities discovered in operation 722, and the capabilities of the 5GMS AS 712 discovered in operation 726. The negotiation may be performed over a MSE-5 interface. In one or more examples, if an application to be executed includes tasks A, B, C, D, and E, the tasks may be split between the client and the network based on the negotiation, where the client performs tasks A and B, and the network may perform tasks C, D, and E.

In operation 730, the SRF 710 requests the 5GMS AS 712 to start the split-rendering process on the edge. For example, the SRF 710 may transmit a message over the MSE-3 interface requesting the 5GMS AS 712 to start the split-rendering process.

In operation 732, the SRF 710 acknowledges to the SRC 708 that the split-rendering on edge is running. The acknowledgment may provide split-rendering access information. The acknowledgment may be provided over the MSE-5 interface.

In operation 734, the SRC acknowledges to the 5GMS Aware Application 702 that the split-rendering on edge is running. The acknowledgement may be transmitted over the MSE-6 interface.

In operation 736, the 5GMS Aware Application 702 requests the 5GMS Client 704 to start a media delivery session. The request in operation 736 may be transmitted over a M-6 interface.

In operation 738, the 5GMS client 704 connects to the split-rendering process on the 5GMS AS 712 using the split-rendering access information provided in operation 732. The 5GMS 704 may request the 5GMS AS 712 to start the media delivery session.

Figure 8:
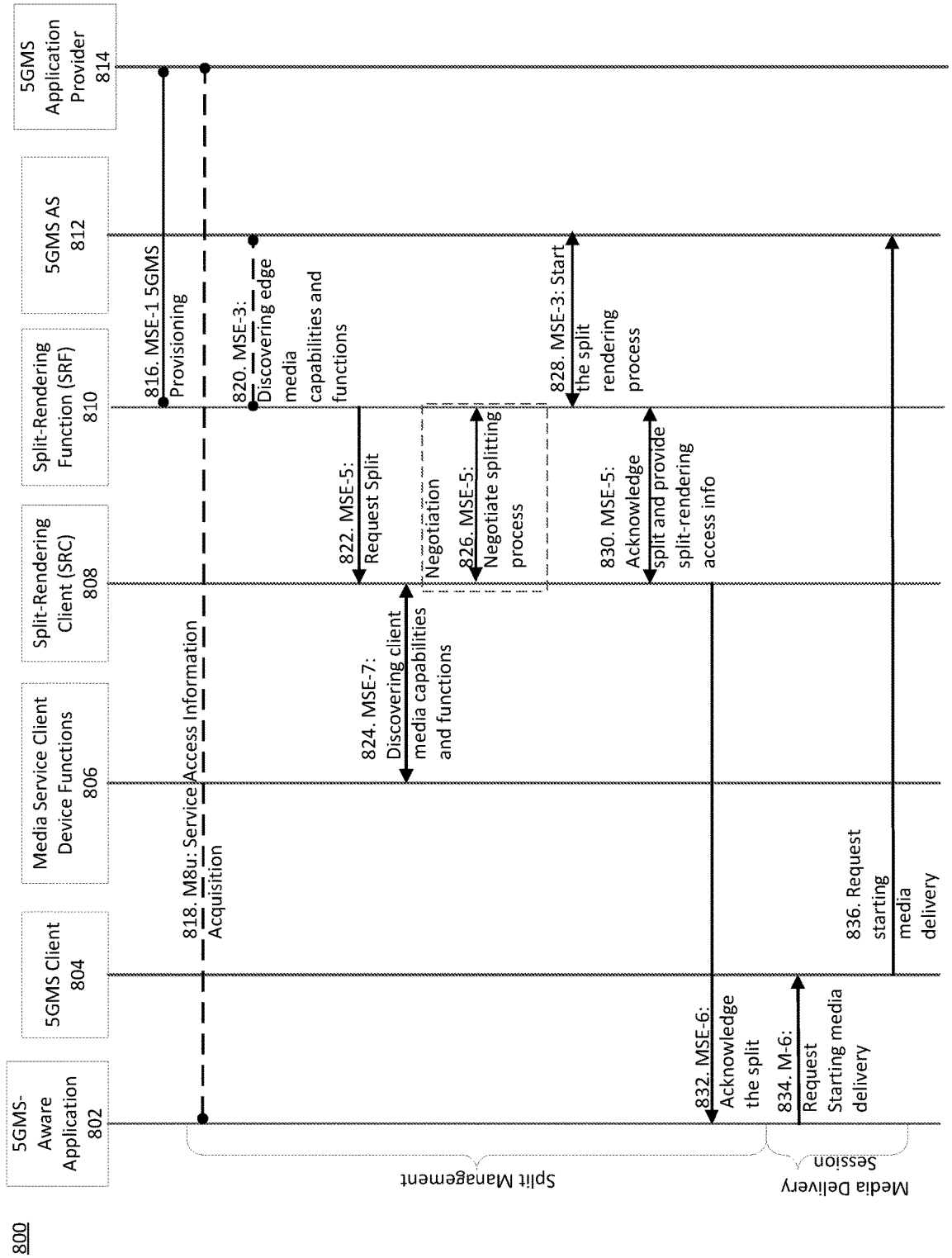
FIG. 8 is a diagram of an operation flow of a network-driven split management process, according to embodiments.

FIG. 8 illustrates a diagram of an operation flow 800 for setting up split-rendering by a network. The operation flow 800 may be performed between a 5GMS Aware Application 802, a 5GMS Client 804, a Media Service Client Device Functions 806, a SRC 808, a SRF 810, a 5GMS AS 812, and a 5GMS Application Provider 814. The 5GMS Aware Application 802 may correspond to the 5GMS Aware Application 702. The 5GMS Client 804 may correspond to the 5GMS Client 704. The Media Service Client Device Functions 806 may correspond to the Media Service Client Device Functions 706. The SRC 808 may correspond to the SRC 708. The SRF 810 may correspond to the SRF 710. The 5GMS AS 812 may correspond to the 5GMS AS 712. The 5GMS Application Provider 814 may correspond to the 5GMS Application Provider 714.

The operation flow 800 may start at operation 816 where the 5GMS Application Service Provider 814 requests the SRF 810 to provision a split management session. The request may be performed over a MSE-1 interface.

In operation 818, the split management session is announced to the 5GMS Aware Application 802 as part of the Service Access Information. The announcement may be performed over the M8u interface.

In operation 820, the SRF 810 may inquire the 5GMS AS 812 about the capabilities of the 5GMS AS 812. The SRF 810 may transmit a message to the 5GMS AS 812, where the 5GMS 812 responds with a message indicating the capabilities of the 5GMS AS 812. The messages of operation 820 may be transmitted over a MSE-3 interface.

In operation 822, the SRF 810 requests the SRC 808 for a split of the client media functions. The request may be transmitted over the MSE-5 interface.

In operation 824, the SRC 808 inquires the Media Service Client Device Functions 806 to discover the client's media capabilities. For example, the SRC 808 may transmit a request to the Media Service Client Device Functions 806, where the Media Service Client Device Functions 806 responds with a message indicating one or more device capabilities of the client. The messages of operation 824 may be transmitted over a MSE-7 interface.

In operation 826, the SRC 808 and SRF 810 negotiate on the acceptable capabilities for the device, and agree on the split option. The negotiation between the SRC 808 and the SRF 810 may be based on the client capabilities discovered in operation 824, and the capabilities of the 5GMS AS 812 discovered in operation 820. The negotiation may be performed over a MSE-5 interface.

In operation 828, the SRF 810 requests the 5GMS AS 812 to start the split-rendering process on the edge. For example, the SRF 810 may transmit a message over the MSE-3 interface requesting the 5GMS AS 812 to start the split-rendering process.

In operation 830, the SRF 810 acknowledges to the SRC 808 that the split-rendering on edge is running. The acknowledgment may provide split-rendering access information. The acknowledgment may be provided over the MSE-5 interface.

In operation 832, the SRC 808 acknowledges to the 5GMS Aware Application 802 that the split-rendering on edge is running. The acknowledgement may be transmitted over the MSE-6 interface.

In operation 834, the 5GMS Aware Application 802 requests the 5GMS Client 804 to start a media delivery session. The request in operation 834 may be transmitted over a M–6 interface.

In operation 836, the 5GMS client 804 connects to the split-rendering process on the 5GMS AS 812 using the split-rendering access information provided in operation 830. The 5GMS 804 may request the 5GMS AS 812 to start the media delivery session.

Figure 9:
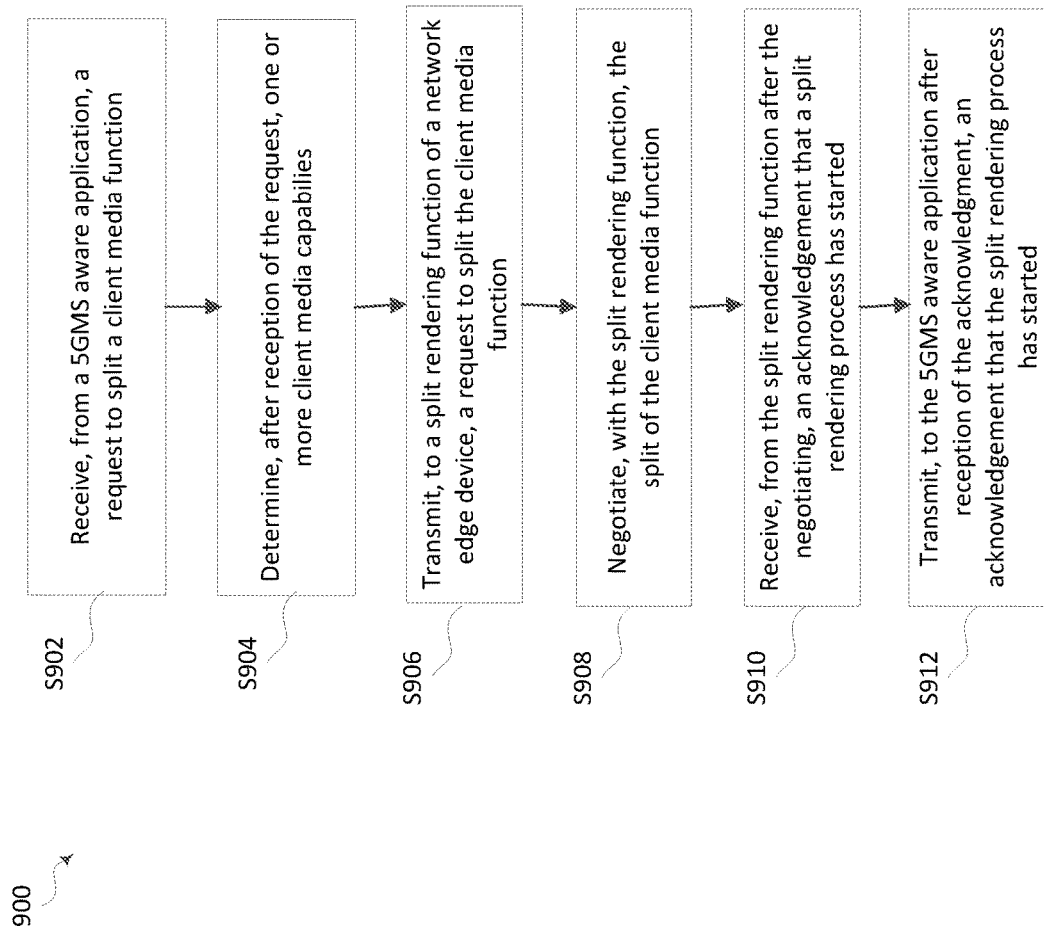
FIG. 9 is flow chart of an example process performed by a split-rendering client of a UE, according to embodiments.

FIG. 9 is a flow chart of an example process 900 performed by a SRC in a UE. The process may be performed by the SRC 502B (FIG. 5) or SRC 708 (FIG. 7).

The process may start at operation S902 where a request to split a client media function is received from a 5GMS aware application. For example, the request may be received in accordance with operation 720 (FIG. 7).

The process proceeds to operation S904, where after reception of the request, one or more client media capabilities are determined. For example, the SRC 708 may determine the client media capabilities in accordance with operation 722.

The process proceeds to operation S906, where a request to split the client media function is transmitted to a split-rendering function. For example, the SRC 708 may transmit the request to split the client media function to the SRF 710 in accordance with operation 724.

The process proceeds to operation S908, where the split client media function is negotiated with the split-rendering function. For example, the SRC 708 negotiates the split client media function with the SRF 710 in accordance with operation 728. The negotiation may be based on the determined client media capabilities, and determined capabilities of a 5GMS AS.

The process proceeds to operation S910, where after the negotiating is performed, an acknowledgement that a split-rendering process has started is received from a split-rendering function. For example, the acknowledgment may be received in accordance with operation 732.

The process proceeds to operation 912, where an acknowledgment that the split-rendering process has started is transmitted to the 5GMS aware application. For example, the SRC 708 transmits an acknowledgement to the 5GMS Aware Application 702 in accordance with operation 734.

Figure 10:
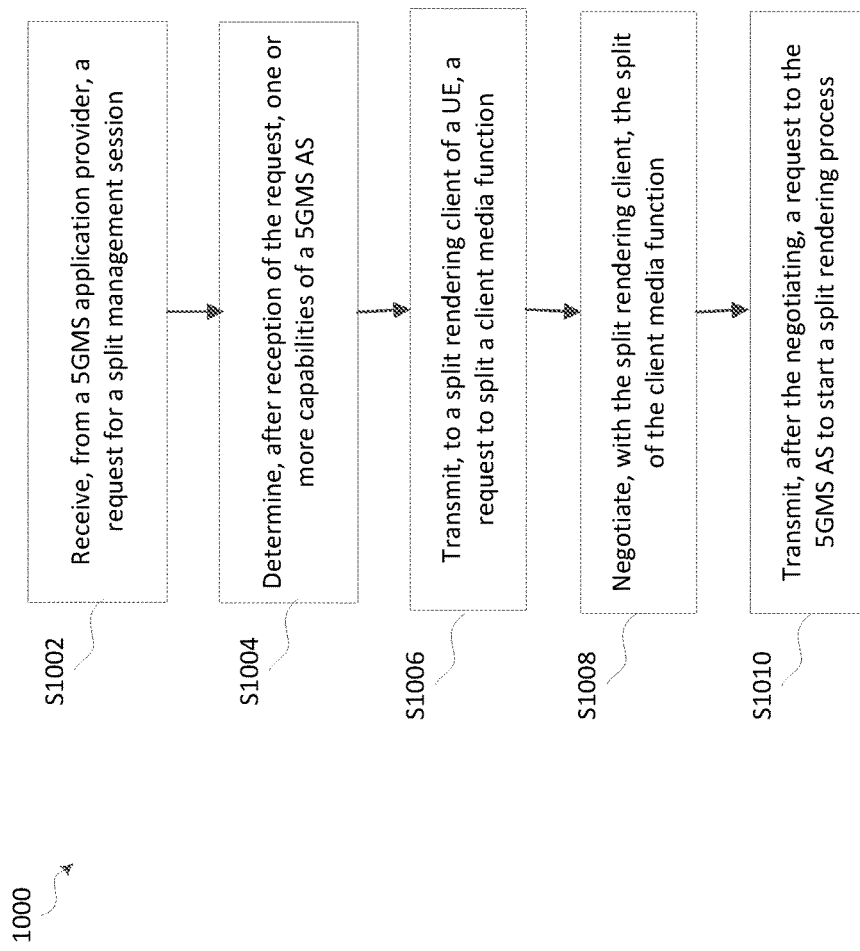
FIG. 10 is a flow chart of an example process performed by a split-rendering function of a network edge device, according to embodiments.

FIG. 10 is a flow chart of an example process 100 performed by a SRF in a network edge device. The process may be performed by the SRF 504 (FIG. 5) or SRF 810 (FIG. 7).

The process may start at operation S1002 where a request for a split management session is received from a 5GMS application provider. For example, the SRF 810 may receive the request from the 5GMS Application Provider 814 in accordance with operation 816.

The process proceeds to operation S1004, where after reception of the request for the split management session, one or more capabilities of the 5GMS AS are determined. For example, the SRF 810 determines the capabilities of the 5GMS AS 812 in accordance with operation 820.

The process proceeds to operation S1006, where a request to split a client media function is transmitted to the SRC. For example, the SRF 810 transmits the request to the SRC 808 in accordance with operation 822.

The process proceeds to operation S1008, where a split of the client media function is negotiated with the SRC. For example, the SRF 810 negotiates the split of the client media function with the SRC 808 in accordance with operation 826.

The process proceeds to operation S1010, where after the negotiating, a request is transmitted to the 5GMS AS to start the split-rendering process. For example, the SRF 810 transmits the request to the 5GMS AS 812 in accordance with operation 828.

The embodiments of the present disclosure result in separation of the split management from media delivery and edge management. This split management solution may be run in parallel and have corresponding interfaces.

The embodiments of the present disclosure results in an architecture that has interfaces for provisioning, the interaction between client and network, Application and client, and network split function and the network application server. The APIs provide enhanced interaction and independence from other architectures (e.g., media delivery and edge management) and simplify the parallel existence of these architectures.

The embodiments of the present disclosure provide a control panel architecture where the entities in this architecture only interact in the control plane and therefore, kept separated from the media plane.

The embodiments of the present disclosure result in initiation of split management by the client or by the network, where either entity can start the negotiation for splitting.

The embodiments of the present disclosure address both static and dynamic splitting with a single architecture, where the same solution may be used for both cases.

According to one or more embodiments, a method is performed for managing the splitting of a client's media functions between the device and network edge computing resources, where these functions are replaced with two sets of functions, one set performed on the device and another set performed on the network edge, where this split-rendering scheme results in a simpler less demanding processes for the device, where a split management architecture defined that provides the capability for the device and network to negotiate and come up with the best split, where interfaces are defined for retrieving the device capabilities, the network computing capabilities, and interface for provision the split management session as well as directing and managing the process by the application on the client or by the Application Service Provider on the network, or delegating the responsibility to the corresponding entities on device and network, where static and dynamic split management can be performed depending the need of media delivery session.

According to one or more embodiments, a procedure is performed for managing the splitting of the client's media functions between the device and network edge computing resources, driven by the client on the device, which after seeing a provisioned split management session, the application requests the client to start the split. The device's split-rendering client negotiates with the split-rendering function on the network, to determine the best realization of the split-rendering. After reaching an agreement, the split-rendering function starts the media split-rendering process on the network and informed the client how to access the split-rendering process on the network, where the client starts the media delivery, by requesting the media from the split-rendering on the network and continues the media delivery.

According to one or more embodiments, a procedure is performed for managing the splitting of the client's media functions between the device and network edge computing resources, driven by the network, which after seeing a provisioned split management session, the split-rendering function on network discovery the network Application Server's media capabilities. The split-rendering function contacts the split-rendering client on the device's split-rendering client and negotiates the best realization of the split the client functions into two parts, network, and device. After reaching an agreement, the split-rendering function starts the media split-rendering process on the network and informed the client how to access the split-rendering process on the network, where the client starts the media delivery, by requesting the media from the split-rendering on the network and continues the media delivery.

According to one or more embodiments, an augmented reality device with a capability of negotiating with the edge/cloud/network on how to split the media delivery process between the device and edge/cloud/network computing resources such that some of the processes run on the edge/cloud/network in a split-rendering fashion and the corresponding remaining processes run on the device, where the device includes a split-rendering management module responsible for that negotiation, where the application on the device can ask the split-rendering module to negotiate with the edge/cloud/network, and the split-rendering management can make inquiries from the media modules their capabilities and then use that information to negotiate with a process on the network for split-rendering negotiation.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method performed by a split-rendering client of a user equipment (UE), the method comprising: receiving a request to split a client media function; determining, after reception of the request to split of the client media function, one or more client media capabilities; transmitting, to a split-rendering function of a network edge device, a request to split the client media function; negotiating, with the network edge device, the split of the client media function based on the one or more client media capabilities and one or more capabilities of a 5GMS application server (AS); receiving, from the network edge device, an acknowledgment that a split-rendering process for the client media function has started on the 5GMS AS; and transmitting an acknowledgement that the split-rendering process for the client media function has started on the 5GMS AS.

(2) The method of feature (1), further comprising: receiving, as part of service access information, an announcement of a split management session over a media service enabler (MSE) 8 interface, in which the one or more client media capabilities are determined via a media service enabler (MSE) 7 interface, in which the request of the split of the client media function received from the 5GMS aware application is received over a media service enabler (MSE) 6 interface, in which the negotiating the split of the client media function is performed over a media service enabler (MSE) 5 interface.

(3) The method of feature (1) or (2), in which the determining the one or more client capabilities further comprises transmitting a request to a media service client device function, and receiving the one or more client capabilities from the media service client device function.

(4) The method of any one of features (1)-(3), in which the one or more capabilities of the 5GMS AS are determined based on the split-rendering function of the network edge device transmitting a request to the 5GMS AS and receiving the one or more capabilities of the 5GMS AS in response to the request.

(5) The method of any one of features (1)-(4), in which the negotiating the split is performed before a media delivery session is started.

(6) The method of any one of features (1)-(5), in which the negotiated split is updated after a media delivery session is started.

(7) The method of feature (6), in which the negotiated split is updated based on one of (i) a workload of the UE exceeding a UE workload threshold, (ii) a processing speed of the UE decreasing below a UE proceeding speed threshold, (iii) a workload of the 5GMS AS exceeding a server workload threshold, or (iv) a processing speed of the 5GMS AS decreasing below a server processing speed threshold.

(8) The method according to any one of features (1)-(7), in which the UE is an augmented reality UE.

(9) The method according to feature (1)-(8), in which a media delivery session between the UE and the 5GMS AS is initiated after the negotiating is performed.

(10) A method performed by a split-rendering function of a network edge device, the method comprising: receiving a request for a split management session to split a client media function; determining, after reception of the request for the split management session, one or more capabilities of a 5GMS application server (AS); transmitting, to a split-rendering client of a user equipment (UE), a request to split the client media function; negotiating, with the UE, the split of the client media function based on the one or more capabilities of the 5GMS AS and one or more client media capabilities of the UE; and transmitting, after the negotiating, a request to the 5GMS AS to start a split-rendering process for the client media function.

(11) The method of feature (10), in which the split management session is announced over a media service enabler (MSE) 8 interface to a 5GMS aware application of the UE as part of an announcement that announces service access information, in which the one or more capabilities of the 5GMS AS are determined via a media service enabler (MSE) 3 interface, in which the request to split the client media function is transmitted over a media service enabler (MSE) 5 interface, and in which the negotiating the split of the client media function is performed over a media service enabler (MSE) 5 interface.

(12) The method of feature (10) or (11), in which the determining the one or more capabilities of the 5GMS AS comprises transmitting a request to the 5GMS AS and receiving the one or more capabilities of the 5GMS AS in response to the request.

(13) The method of any one of features (10)-(12), the one or more capabilities of the UE are determined based on the split-rendering client of the UE transmitting a request to a media service client device function and receiving the one or more capabilities of the UE in response to the request.

(14) The method of any one of features (10)-(13), in which the request transmitted to the 5GMS AS to start a split-rendering process for the client media function is transmitted over a media service enabler (MSE) 7 interface.

(15) The method of any one of features (10)-(14), in which the negotiating the split is performed before a media delivery session is started.

(16) The method of any one of features (10)-(15), in which the negotiated split is updated after a media delivery session is started.

(17) The method of feature (16), in which the negotiated split is updated based on one of (i) a workload of the UE exceeding a UE workload threshold, (ii) a processing speed of the UE decreasing below a UE proceeding speed threshold, (iii) a workload of the 5GMS AS exceeding a server workload threshold, or (iv) a processing speed of the 5GMS AS decreasing below a server processing speed threshold.

(18) The method according to any one of features (10)-(17), wherein a media delivery session between the UE and the 5GMS AS is initiated after the negotiating is performed.

(19) A user equipment, comprising: at least one memory configured to store program code; and at least one processor configured to read the program code and operate as instructed by the program code, the program code including: first receiving code configured to cause the at least one processor to receive a request to split a client media function; determining code configured to cause the at least one processor to determine, after reception of the request to split of the client media function, one or more client media capabilities; first transmitting code configured to cause the at least one processor to transmit, to a split-rendering function of a network edge device, a request to split the client media function; negotiating code configured to cause the at least one processor to negotiate, with the network edge device, the split of the client media function based on the one or more client media capabilities and one or more capabilities of a 5GMS application server (AS); second receiving code configured to cause the at least one processor to receive, from the network edge device, an acknowledgment that a split-rendering process for the client media function has started on the 5GMS AS; and second transmitting code configured to cause the at least one processor to transmit an acknowledgement that the split-rendering process for the client media function has started on the 5GMS AS.

(20) A network edge device, comprising: at least one memory configured to store program code; and at least one processor configured to read the program code and operate as instructed by the program code, the program code including: receiving code configured to cause the at least one processor to receive a request for a split management session to split a client media function; determining code configured to cause the at least one processor to determine, after reception of the request for the split management session, one or more capabilities of a 5GMS application server (AS); first transmitting code configured to cause the at least one processor to transmit, to a split-rendering client of a user equipment (UE), a request to split the client media function; negotiating code configured to cause the at least one processor to negotiate, with the UE, the split of the client media function based on the one or more capabilities of the 5GMS AS and one or more client media capabilities; and second transmitting code configured to cause the at least one processor to transmit, after the negotiating, a request to the 5GMS AS to start a split-rendering process for the client media function.

What is claimed is:

1. A method performed by a split-rendering client of a user equipment (UE), the method comprising:
    receiving a request to split a client media function;
    determining, after reception of the request to split of the
        client media function, one or more client media capabilities;
    transmitting, to a split-rendering function of a network
        edge device, a request to split the client media function;
    negotiating, with the network edge device, the split of the
        client media function based on the one or more client
        media capabilities and one or more capabilities of a
        5GMS application server (AS);

receiving, from the network edge device, an acknowledgment that a split-rendering process for the client media function has started on the 5GMS AS; and transmitting an acknowledgement that the split-rendering process for the client media function has started on the 5GMS AS.

2. The method of claim 1, further comprising:

receiving, as part of service access information, an announcement of a split management session over a media service enabler (MSE) 8 interface, wherein the one or more client media capabilities are determined via a media service enabler (MSE) 7 interface, wherein the request of the split of the client media function received from the 5GMS aware application is received over a media service enabler (MSE) 6 interface, wherein the negotiating the split of the client media function is performed over a media service enabler (MSE) 5 interface.

3. The method of claim 1, wherein the determining the one or more client capabilities further comprises transmitting a request to a media service client device function, and receiving the one or more client capabilities from the media service client device function.

4. The method of claim 1, wherein the one or more capabilities of the 5GMS AS are determined based on the split-rendering function of the network edge device transmitting a request to the 5GMS AS and receiving the one or more capabilities of the 5GMS AS in response to the request.

5. The method of claim 1, wherein the negotiating the split is performed before a media delivery session is started.

6. The method of claim 1, wherein the negotiated split is updated after a media delivery session is started.

7. The method of claim 6, wherein the negotiated split is updated based on one of (i) a workload of the UE exceeding a UE workload threshold, (ii) a processing speed of the UE decreasing below a UE proceeding speed threshold, (iii) a workload of the 5GMS AS exceeding a server workload threshold, or (iv) a processing speed of the 5GMS AS decreasing below a server processing speed threshold.

8. The method according to claim 1, wherein the UE is an augmented reality UE.

9. The method according to claim 1, wherein a media delivery session between the UE and the 5GMS AS is initiated after the negotiating is performed.

10. A user equipment, comprising:

at least one memory configured to store program code; and at least one processor configured to read the program code and operate as instructed by the program code, the program code including:

first receiving code configured to cause the at least one processor to receive a request to split a client media function;

determining code configured to cause the at least one processor to determine, after reception of the request to split of the client media function, one or more client media capabilities;

first transmitting code configured to cause the at least one processor to transmit, to a split-rendering function of a network edge device, a request to split the client media function;

negotiating code configured to cause the at least one processor to negotiate, with the network edge device, the split of the client media function based on the one or more client media capabilities and one or more capabilities of a 5GMS application server (AS);

second receiving code configured to cause the at least one processor to receive, from the network edge device, an acknowledgment that a split-rendering process for the client media function has started on the 5GMS AS; and second transmitting code configured to cause the at least one processor to transmit an acknowledgement that the split-rendering process for the client media function has started on the 5GMS AS.

* * * * *